(12) United States Patent  (10) Patent No.: US 8,176,231 B2
Kuo et al.  (45) Date of Patent: May 8, 2012

(54) METHODS FOR HANDLING DATA UPDATING OF FLASH MEMORY AND RELATED MEMORY CARDS

(75) Inventors: Wu-Chi Kuo, Kaohsiung (TW); Chi-Hsiang Hung, Taipei (TW)

(73) Assignee: Silicon Motion, Inc., Jhubei (TW)

( * ) Notice: Subject to any disclaimer, the term of this patent is extended or adjusted under 35 U.S.C. 154(b) by 428 days.

(21) Appl. No.: 12/404,335

(22) Filed: Mar. 15, 2009

(65) Prior Publication Data

US 2010/0088462 A1    Apr. 8, 2010

(30) Foreign Application Priority Data

Oct. 3, 2008 (TW) ................. 97138157 A (51) Int. Cl.
*G06F 12/00* (2006.01)
*G11C 16/10* (2006.01)

(52) U.S. Cl. . 711/103; 711/115; 711/203; 711/E12.008; 707/824; 707/E17.01

(58) Field of Classification Search .......... None
See application file for complete search history.

(56) References Cited

U.S. PATENT DOCUMENTS

| | | | |
|---|---|---|---|
| 5,603,001 A * | 2/1997 | Sukegawa et al. ............ 711/103 |
| 6,347,355 B1 * | 2/2002 | Kondo et al. ................. 711/103 |
| 7,039,788 B1 * | 5/2006 | Chang et al. .................. 711/203 |
| 2006/0022054 A1 * | 2/2006 | Elhamias et al. ............. 235/492 |
| 2008/0270679 A1 * | 10/2008 | Joo ............................... 711/103 |
| 2009/0144488 A1 * | 6/2009 | Chen ............................ 711/103 |

* cited by examiner

*Primary Examiner* — Reginald Bragdon
*Assistant Examiner* — Daniel Bernard
(74) *Attorney, Agent, or Firm* — Wang Law Firm, Inc.; Li K. Wang (57) ABSTRACT

A method for handling data updating of a flash memory is disclosed, in which the flash memory comprises a mother block with a plurality of pages to be updated, and each page comprises a plurality of sectors. In such method, a first data for updating a target page in the mother block is obtained, and then whether the first data comprises data for updating an ending sector in the target page is determined. The first data is written into a replacing page in a first FAT block when the first data does not comprise data for updating the ending sector in the target page. The first data is written into a corresponding page in a second FAT block when the first data comprises the data for updating the ending sector, in which the corresponding page in the second FAT block and the target page in the mother block have the same page indexes.

20 Claims, 14 Drawing Sheets

METHODS FOR HANDLING DATA UPDATING OF FLASH MEMORY AND RELATED MEMORY CARDS

CROSS REFERENCE TO RELATED APPLICATIONS

This application claims priority of Taiwan Patent Application No. 097138157, filed on Oct. 3, 2008, the entirety of which is incorporated by reference herein.

BACKGROUND OF THE INVENTION

1. Field of the Invention

The invention relates to a flash memory, in particular to a method for handling data updating of a flash memory and related memory cards.

2. Description of the Related Art

A flash memory is a non-volatile memory that can be electrically erased and reprogrammed. Flash memories are primarily used in memory cards and USB flash drives for general storage and transfer of data between computers and other digital products. Flash memory costs far less than EEPROM and therefore has become a dominant memory device. Examples of products applying flash memory include Personal Digital Assistants (PDA) and laptop computers, digital audio players, digital cameras and mobile phones.

A flash memory comprises a large number of blocks, and each block comprises a plurality of pages for storing data. A flash memory is erased by a unit of a block and programmed by a unit of a page, when data of the flash memory is erased, all pages of a block of the memory must be erased together. When data is written to a flash memory, the data, however, can be written to a specific page of a block of the flash memory. In addition, data can only be written to a page where no data is stored or a page which has been erased.

However, each block of the flash memory could only be erased certain times. When the erased times of a block exceed a threshold value, the block can not be written correctly and mistakes may occur while the data is read from the block, it is very important to use the block averagely to service lifetime of the flash memory, however, the conventional erasing and writing ways can not effectively achieve the goal.

Therefore, a more efficient and average way of utilizing the block of the flash memory is required.

BRIEF SUMMARY OF THE INVENTION

The present invention provides a method for handling data updating of a flash memory, in which the flash memory comprises a mother block with a plurality of pages to be updated, wherein each page comprises a plurality of sectors. The method includes: obtaining a first data for updating a target page in the mother block; determining whether the first data comprises data for updating an ending sector in the target page; writing the first data into a replacing page in a first file allocation table (FAT) block when the first data does not comprise data for updating the ending sector in the target page; and writing the first data into a corresponding page in a second FAT block when the first data comprises the data for updating the ending sector in the target page, wherein the corresponding page in the second FAT block and the target page in the mother block have the same page indexes.

The present invention also provides a memory card, comprising a flash memory and a controller, in which the flash memory comprises a mother block, a first FAT block, and a second FAT block. The mother block includes a plurality of pages to be updated, and each page includes a plurality of sectors. A controller obtains a first data for updating a target page in the mother block, writes the first data into a replacing page in a first FAT block when the first data does not comprise the data for updating an ending sector in the target page, and writes the first data into a corresponding page in a second FAT block when the first data comprises the data for updating the ending sector in the target page. The corresponding page in the second FAT block and the target page in the mother block have the same page indexes.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. The description is made for the purpose of illustrating the general principles of the invention and should not be taken in a limiting sense. The scope of the invention is best determined by reference to the appended claims.

Figure 1:
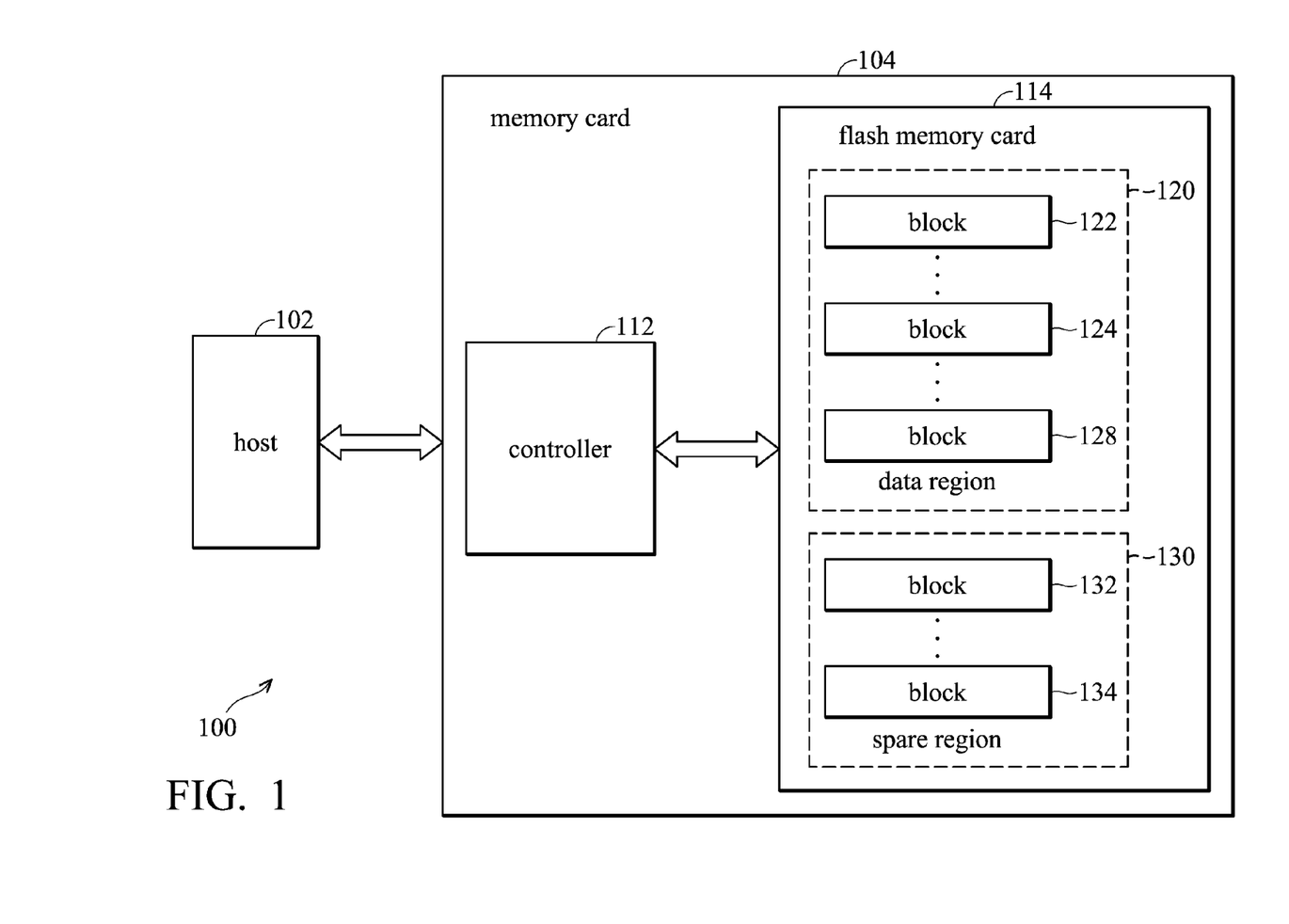
FIG. 1 is a diagram of an electronic system according to the invention.

FIG. 1 is a diagram of an electronic system according to the invention. As shown in the FIG. 1, the electronic system comprises a host 102 and a memory card 104, in which the memory card 104 includes a controller 112 and a flash memory 114. In one embodiment, the flash memory 114 is a NAND flash memory, but is not limited thereto. The flash memory 114 comprises a plurality of blocks, each block has a plurality pages. In the blocks of the flash memory, the blocks that store data are logically grouped to a data region 120, for example, the blocks 122~128, and then the blocks that do not store data are logically grouped to a spare region 130, for example, the blocks 132~134.

The flash memory 114 is programmed in a unit of a page. When a few specific pages of a block do not have stored data, the controller 112 writes data into the specific pages of the block. The flash memory 114 is erased in a unit of a block. Once a page of block needs to be erased, the controller 112 erases all pages of the block together. Because the controller 112 can only write data to pages without stored data, when the host 102 must update data of pages which have stored data, the controller 112 must handle data updating according to a specially devised method.

Figure 2:
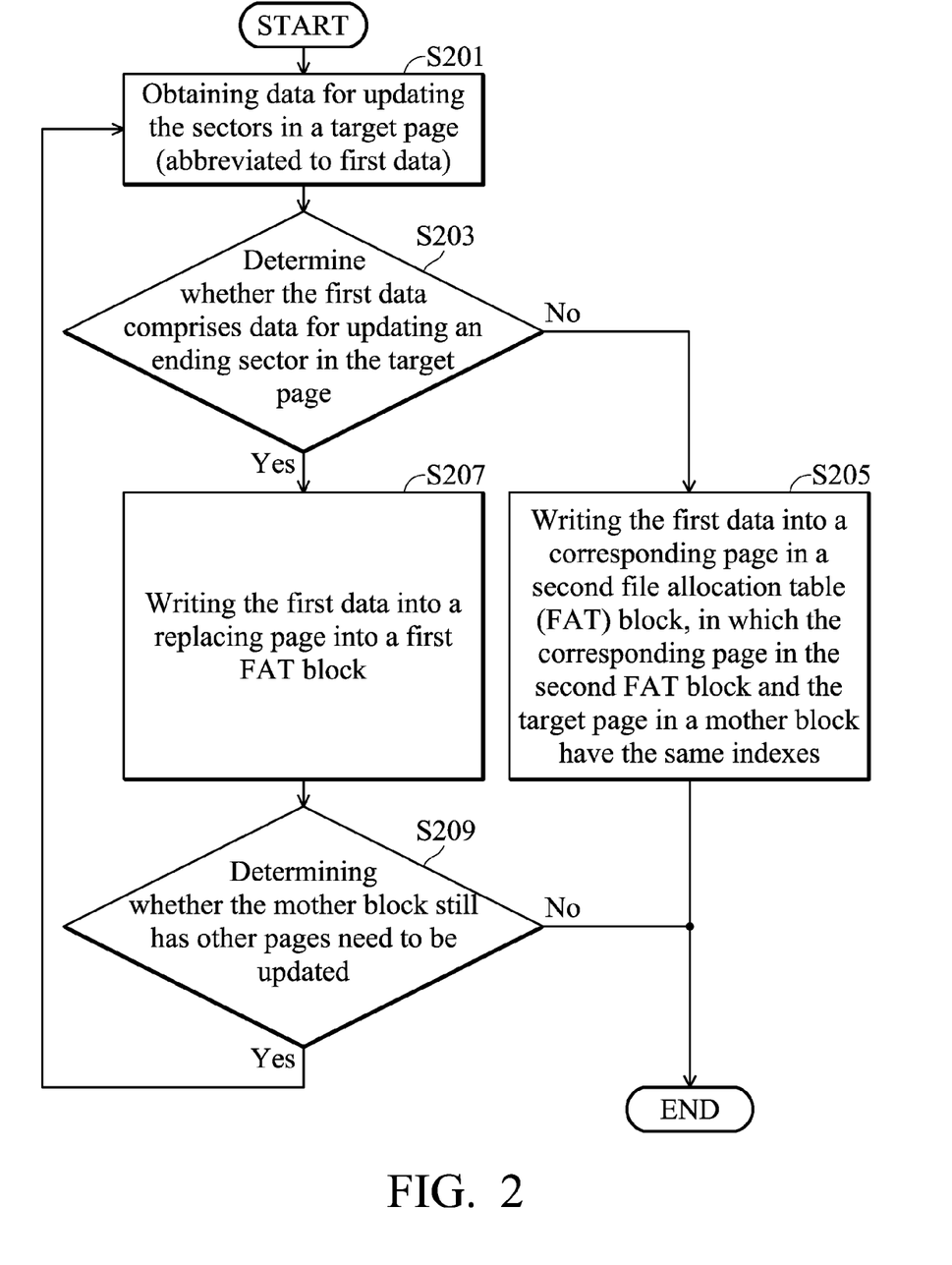
FIG. 2 is a flowchart of a method for handling data updating of a flash memory according to the invention.
Figure 3:
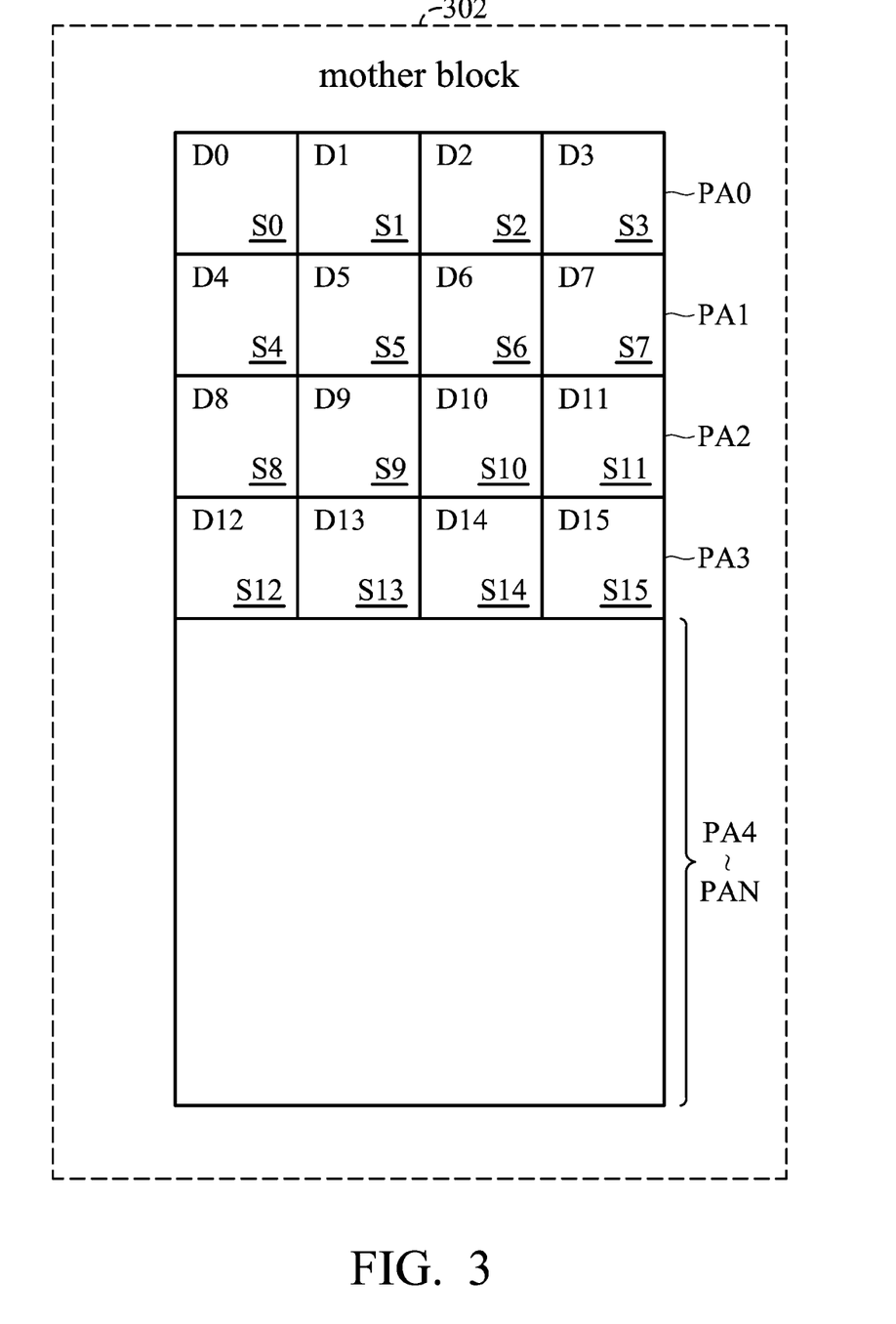
FIG. 3 is a diagram of a mother block in the flash memory according to the invention.

Referring to FIG. 2, a flowchart of a method for handling data updating of a flash memory according to the invention is shown. Assume that the host 102 requests the controller 112 to update a few pages of a mother block and deliver updating data of the pages to the controller 112. The pages of the mother block to be updated, however, may already have stored data therein and the controller 112 is not able to directly write data to the updated pages of the mother block. The controller 112 then performs data updating according to the method shown in FIG. 2. FIG. 3 is a diagram of the mother block 302. As shown, the mother block 302 comprises a plurality of pages, PA0~PAN, each page of the PA0~PAN comprises four sectors, but is not limited thereto. For example, the sectors S0~S3 in the page PA0 store data D0~D3, the sectors S4~S7 in the page PA1 store data D4~D7, the sectors S8~S11 in the page PA2 store data D8~D11, and so forth.

In step S201, the controller 201 obtains a first data to update sectors of a target pages. Assuming that the host 102 requires the controller 112 to update the data of the sectors in PA0 of the mother block 302, the controller must obtain the data to update sectors in the page PA0. Before step S201, note that the controller 112 selects the block where no data is stored (i.e. blank) from the spare region 130, and the spare region 130 has at least a spare block that was previously?? erased. The spare block selected by the controller 112 is regarded as a first FAT block corresponding to the mother block to be updated.

In step S203, the controller 112 determines whether the first data comprises data for updating an ending sector in the target page. If the first data does not comprise the data for updating the ending sector in the target page, then the process moves to step S205. otherwise, the process moves to step S207. In the embodiment, the ending sector is the last sector in the pages PA0~PAN, for example, the sectors S3, S7, S11, S15 and so forth. For example, the controller 112 determines whether the first data comprises data for updating the sector S3 in the page PA0. If the first data comprises the data for updating the sector S3, then the process moves to step S205, otherwise, if the first data does not comprise the data for updating the sector S3, then the process moves to step S207.

In step S205, the controller 112 writes the first data into a replacing page in the first FAT. Specifically, the controller 112 obtains a second data from the mother block 302, in which the second data is configured to update sectors which are not updated by the first data in the target page, and writes the first and second data into the replacing page in the first FAT block.

In step S207, the controller 112 writes the first data into a corresponding page in a second FAT block. Specifically, the controller determines whether the first data comprises data for updating all sectors in the target page. If yes, the controller directly writes the first data into the corresponding page in the second FAT block. Note that the corresponding page in the second FAT block and the target page in the mother block have the same indexes, otherwise, if the first data does not comprise data for updating all sectors in the target page, then the controller 112 obtains a third data of the sectors from the mother block 302 or the first FAT block, in which the sectors do not need to be updated by the first data, and writes the first and third data into the corresponding page in the second FAT block.

Also, in step 209, the controller 112 determines whether there is any page in the mother block 302 that is required to be processed. If there are other pages that need to be processed, then the steps return back to step 201. For example, if the host 102 requests to update data of the sectors S3 and S4 in the mother block 302, the controller 112 determines that the next page PA1 needs to be updated after the page PA0 is updated, and therefore the steps return back to step S201, otherwise, if the host 102 only requests to update data of the sectors S0, S1, S2 and/or S3 in the mother block 302, the controller 112 determines that there is no page that is required to be updated after the page PA0 is updated. In addition, the controller 112 records a mapping relationship between the replacing page and the page needs to be updated or the relationship between the corresponding page and the page needs to be updated to a page mapping table in the first FAT block. FIGS. 4A~4G are diagrams for handling data updating of a flash memory according to the invention. The following describes a first embodiment of the method for handling data updating of a flash memory according to FIG. 3 and FIGS. 4A~4G.

Figure 4A:
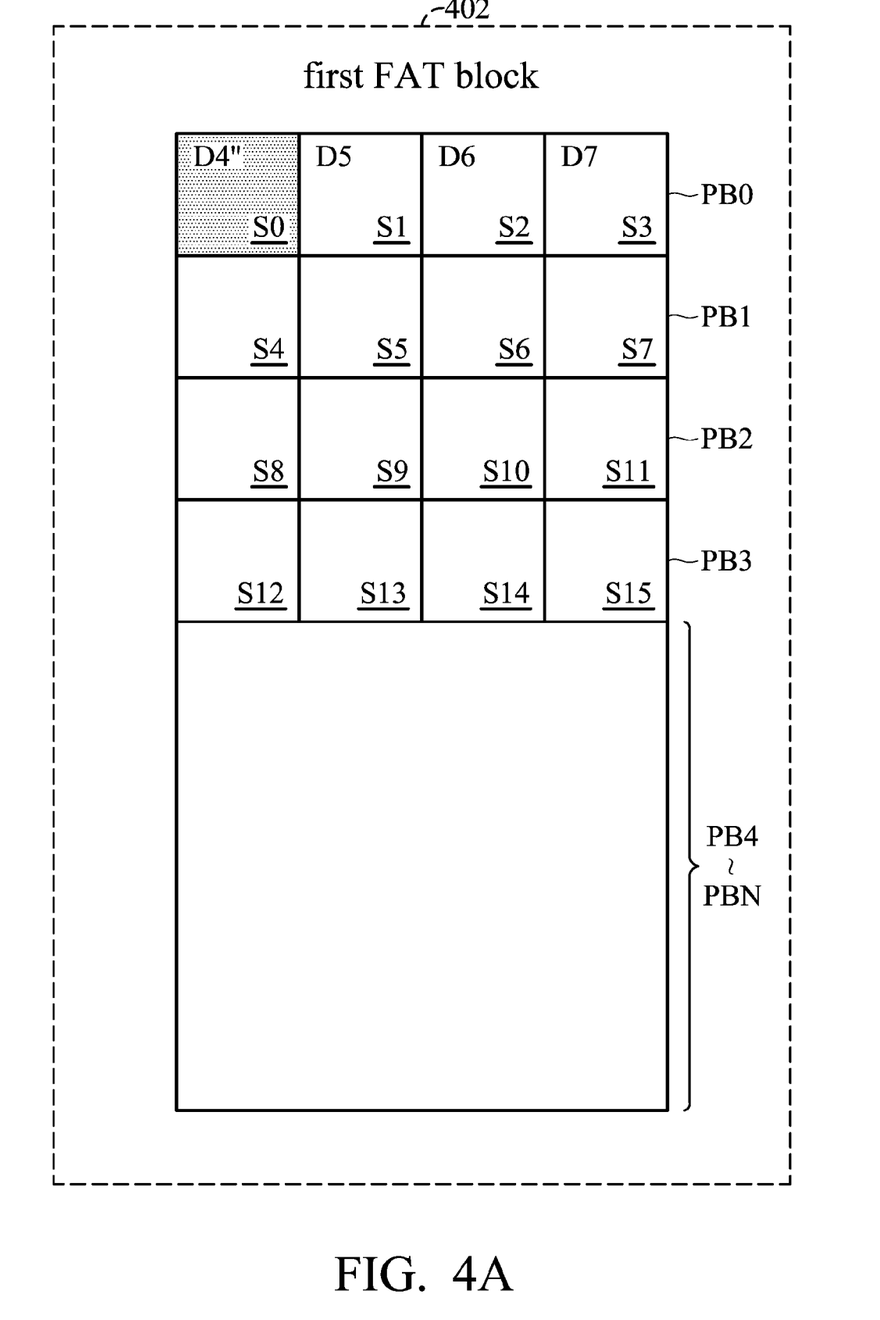
FIG. 4A is a diagram of a first file allocation table (FAT) block and a second FAT block in the flash memory according to the invention.
Figure 4B:
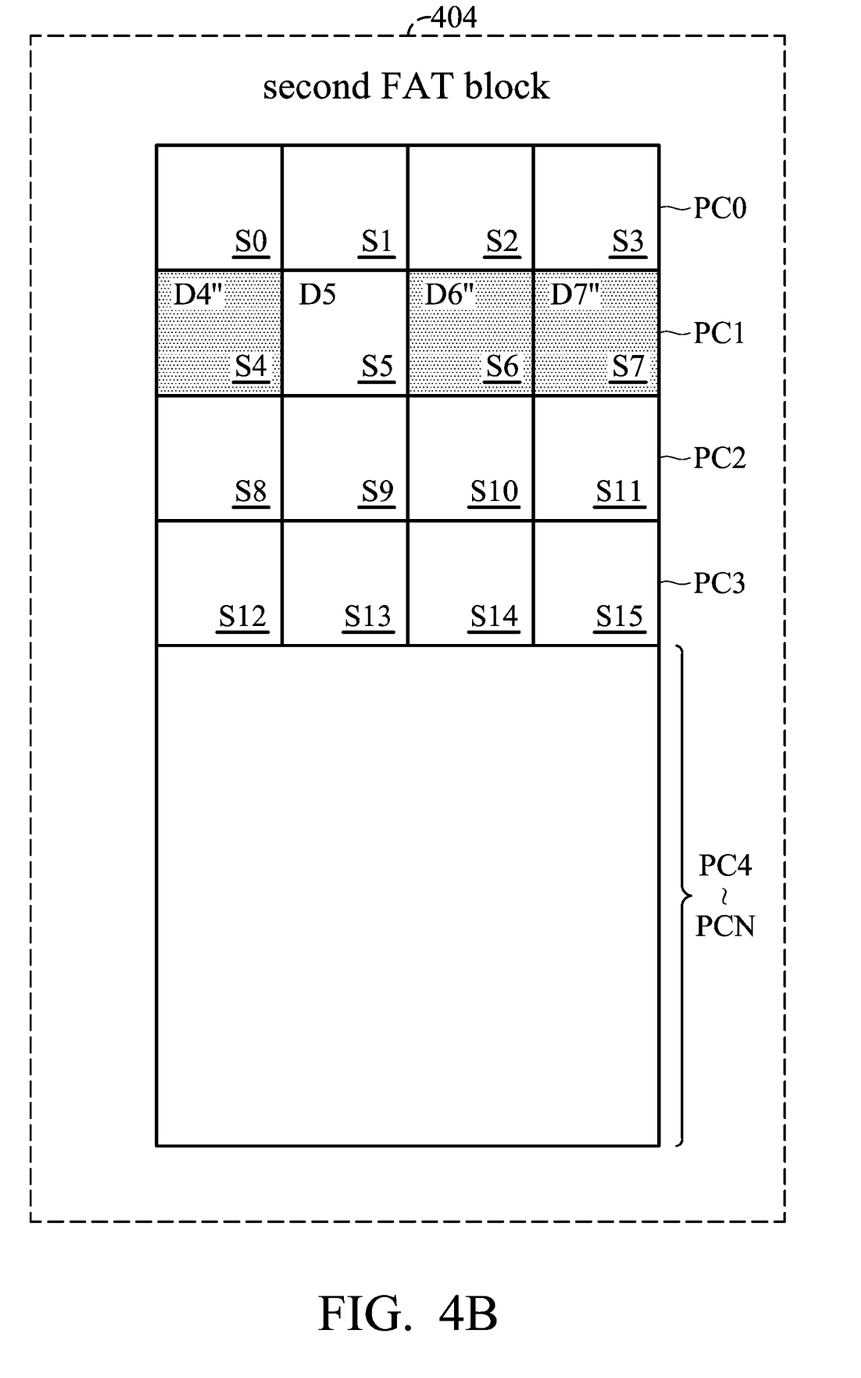
FIG. 4B is another diagram of the first and the second FAT block in the flash memory according to the invention.
Figure 4C:
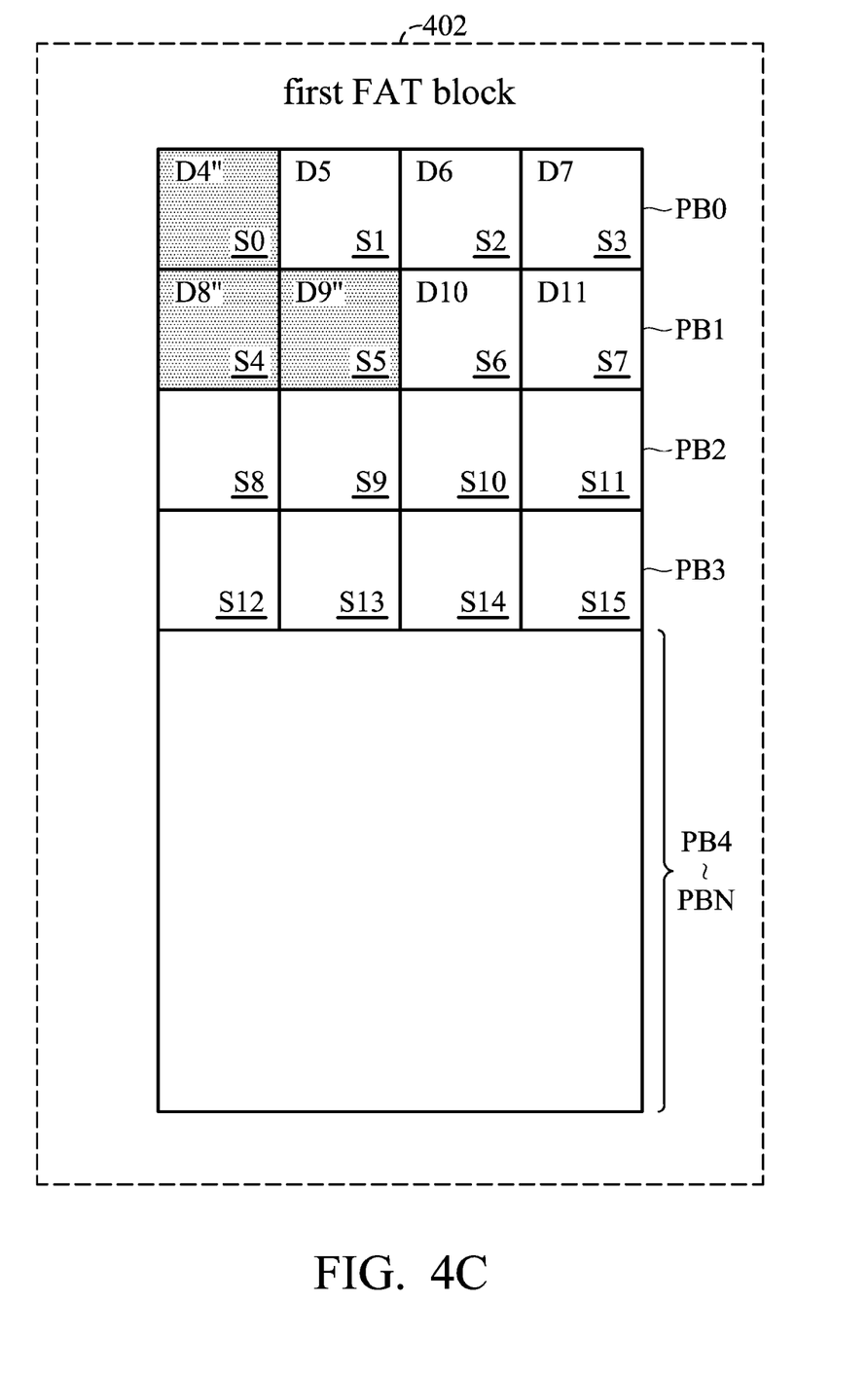
FIG. 4C is another diagram of the first and the second FAT block in the flash memory according to the invention.

Assume that the host 102 requests the controller 112 to update the sector S4 of the PA1 in the mother block 302, and delivers a data D4" for updating the sector S4 to the controller 112, the host 102 delivers an instruction, in which the write LBA and data length of the instruction are the 4 and 1 sector, respectively. The controller 112 selects the spare block as the first FAT block 402 from the spare region 130, and obtains the data D4" for updating the sector S4. Since the data D4" is not configured to update data of the ending sector S7 in the page PA1, the controller 112 obtains the data D5~D7 of the sectors S5~S7 of the page PA1 in the mother block 302, and writes the data D4" and D5~D7 into the sectors S0~S3 of the page PB0 of the first FAT block, respectively, as shown in FIG. 4A.

Furthermore, assume that the host 102 requests the controller 112 to update the sectors S6~S7 of the page PA1 in the mother block 302, and deliver the data D6"~D7" to update sectors S6~S7 to the controller 112, the host 102 delivers an instruction, in which the write LBA and data length of the instruction are the 6 and 2 sectors, respectively. The controller 112 obtains the data D6"~D7" to update sectors S6~S7 in the page PA1. Since the data D7" is configured to update data of the ending sector S7 in the page PA1, the controller selects another spare block as the second FAT block 404 from the spare region 130. Afterward the controller 112 obtains the data D4" and D5 of the sector S4~S5 from the page PB0 of the first FAT block 402, and writes the data D4", D5 and D6"~D7" into the sectors S4~S7 of the page PC1 of the second FAT block, respectively, as shown in the FIG. 4B.

Assume that the host 102 then requests the controller 112 to update the sectors S8~S9 of the page PA2 in the mother block 302, and delivers the data D8"~D9" to update sectors S8~S9 to the controller 112, the host 102 delivers an instruction, in which the write LBA and data length of the instruction are the 8 and 2 sectors, respectively. The controller 112 obtains the data D8"~D9" to update sectors S8~S9 in the page PA1. Since the data D8"~D9" are not configured for updating data of the ending sector S11 in the page PA2, the controller 112 obtains the data D10~D11 of the sectors S10~S11 in the page PA2 from the mother block 302, and writes the data D8"~D9" and D10~D11 into the sectors S4~S7 of the page PB1 of the first FAT block 402, respectively, as shown in the FIG. 4C.

Figure 4D:
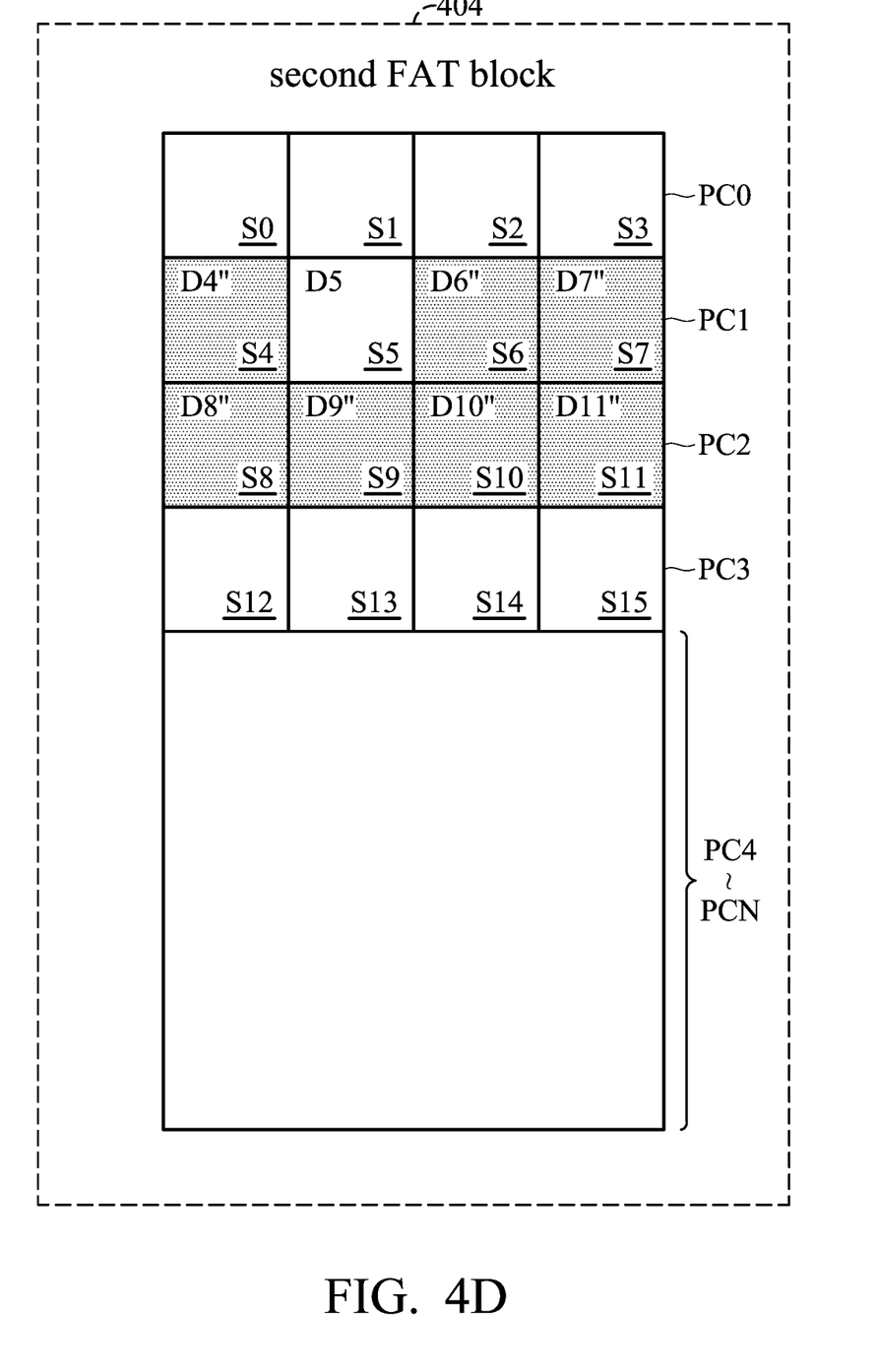
FIG. 4D is another diagram of the first and the second FAT block in the flash memory according to the invention.
Figure 4E:
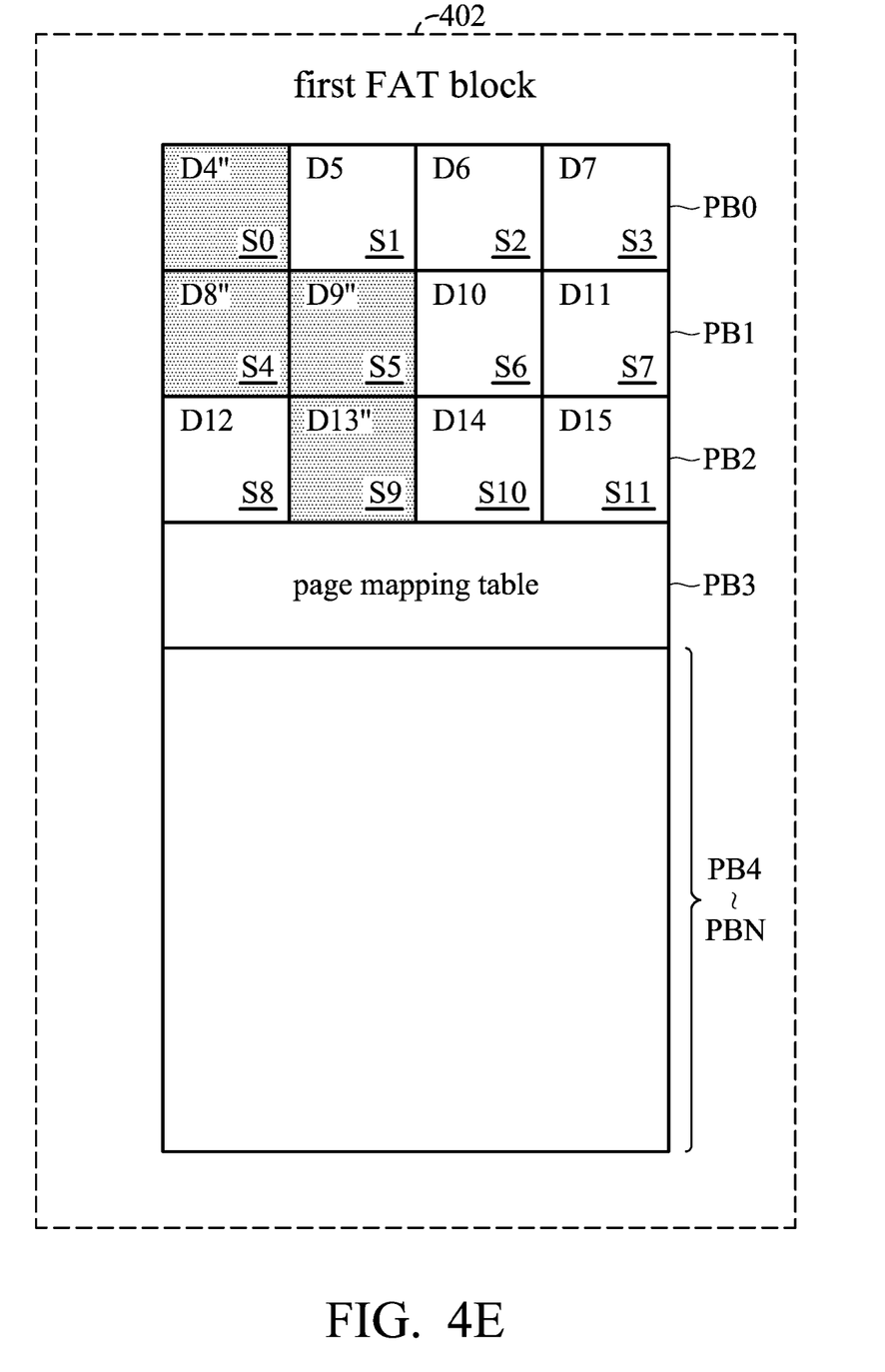
FIG. 4E is another diagram of the first and the second FAT block in the flash memory according to the invention.

Furthermore, assume that the host 102 requests the controller 112 to update the sectors S10~S11 of the page PA2 in the mother block 302, and deliver the data D10"~D11" to update sectors S10~S11 to the controller 112, the host 102 delivers an instruction, in which the write LBA and data length of the instruction are the 10 and 2 sectors, respectively. The controller 112 obtains the data D10"~D11" to update sectors S10~S11 in the page PA2. Since the data D11" is configured for updating data of the ending sector S11 in the page PA2, the controller 112 obtains the data D8"~D9" of the sectors S8~S9 from the page PB1 of the first FAT block 402, and writes the data D8"~D11" into the sectors S8~S11 of the page PC2 of the second FAT block, respectively, as shown in the Fig. D.

Assume that the host 102 then requests the controller 112 to update the sector S13 of the page PA3 in the mother block 302, and delivers the data D13" to update sectors S13 to the controller 112, the host 102 delivers an instruction, in which the write LBA and data length of the instruction are the 13 and 1 sector, respectively. The controller 112 obtains the data D13" to update sectors S13 in the page PA3. Since the data D13" is not configured for updating data of the ending sector S15 in the page PA3, the controller 112 obtains the data D12 and D14~D15 of the sectors S12 and S14~S15 in the page PA3 from the mother block 302, and writes the data D12, D13" and D14~D14 into the sectors S8~S11 of the page PB2 of the first FAT block 402, respectively, as shown in the FIG. 4E. If there is no page that is required to be updated in the mother block 302, the controller 112 records a mapping relationship between the replacing page PB2 and the page PA3 that is required to be updated in the mother block 302 or a mapping relationship between the corresponding pages PC1~PC2 and the pages PA1~PA2 that need to be updated in the mother block 302 to a page mapping table of the page PB3 in the first FAT block 402.

Figure 4F:
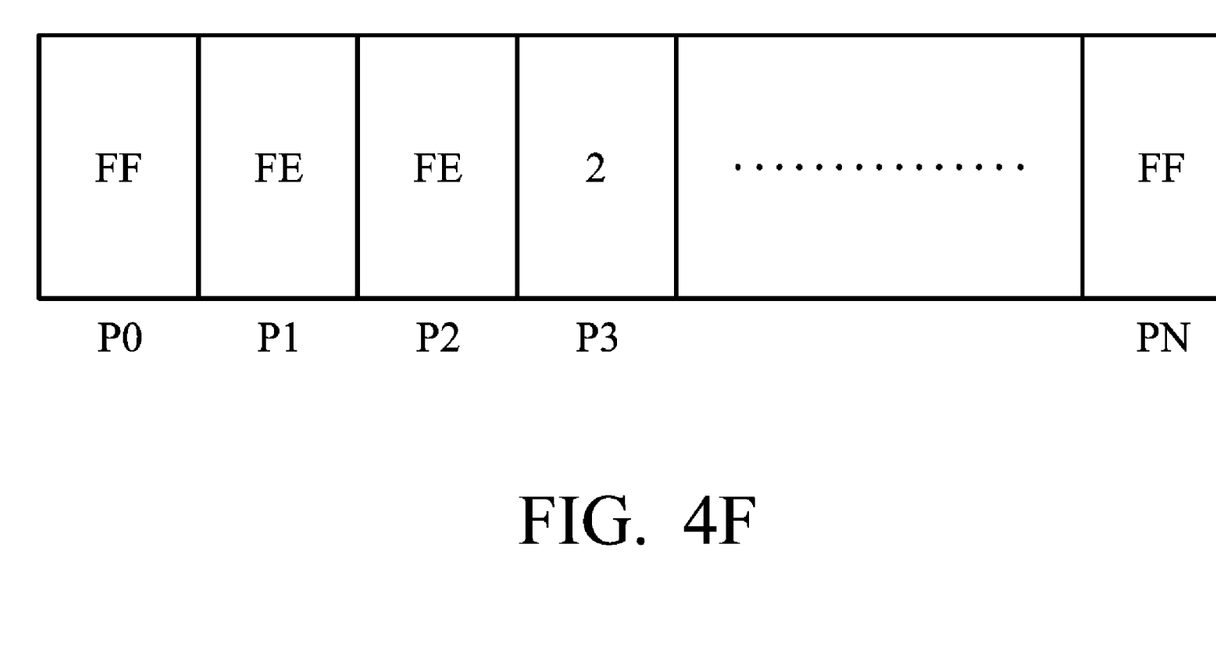
FIG. 4F is another diagram of the first and the second FAT block in the flash memory according to the invention.

FIG. 4F is a diagram of the page mapping table recorded in the page PB3. The page PB3 has a plurality of storage units with sequential indexes P0, P1, P2, P3 . . . and PN. The storage units P0~PN are respectively corresponding to the pages PA0~PAN of the mother block 302, and content stored in the storage units P0~PN indicates that the latest data of each page is stored in the mother block 302, the first FAT block 402 or the second FAT block 404. That is, the ordering of the storage units and their stored content are utilized to explain the mapping relationship. Detailed descriptions are as follows. When the controller 112 reads the latest data of the page PA0 of the mother block 302, it first reads the data stored in the page mapping table P0. If the controller 112 reads a first specific character, namely, the "FF" as shown in FIG. 4F, then it represents that the latest data of the page PA0 of the mother block 302 is stored in the page PA0 of the mother block 302, and further the controller 112 reads the latest data from the page PA0 of the mother block.

When the controller 112 reads the latest data of the page PA1 of the mother block 302, it first reads the data stored in the page mapping table P1. If the controller 112 reads a second specific character, namely, the "FE" as shown in FIG. 4F, then it represents that the latest data of the page PA1 of the mother block 302 is stored in the page PC1 of the second FAT block 404, and further the controller 112 reads the latest data from the page PC1 of the second FAT block 404.

When the controller 112 reads the latest data of the page PA3 of the mother block 302, it first reads the data stored in the page mapping table P3. If the controller 112 reads the value (such as "2" in FIG. 4F) within a specific page range (such as a block with the page number 0~N), then it represents that the latest data of the page PA1 of the mother block 302 is stored in the page PB2 of the first FAT block 402, and further the controller 112 reads the latest data from the page PB2 of the first FAT block 402, and so forth.

Figure 4G:
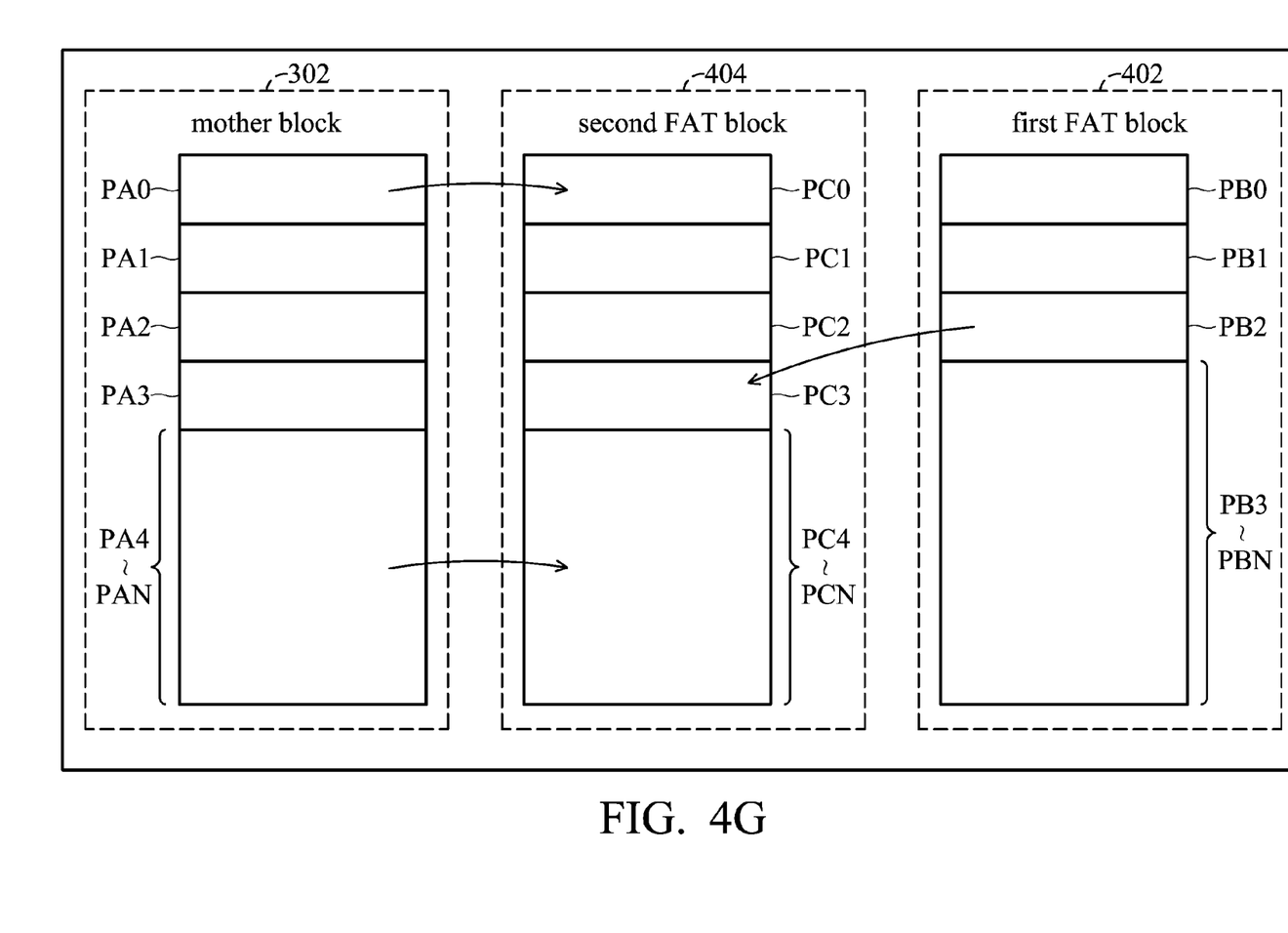
FIG. 4G is another diagram of the first and the second FAT block in the flash memory according to the invention.

When the first FAT block 402 is full and the latest data can not be written into it, the controller 112 proceeds with a data integrating process to integrate the data in the mother block 302, the updated data in the first FAT block 402 and the updated data in the second FAT block 404, as shown in the FIG. 4G. For example, the controller 112 writes the updated data in the first FAT block 402 so that the data is not required be updated into the second FAT block 404. Specifically, the controller 112 writes the data in the page PA0 of the mother block 302 (that is, the data is not required to be updated D0~D3) into the page PC0 of the second FAT block 404 and writes the updated data of the first FAT block PB2 into the page PC3 of the second FAT block 404 according to the page mapping table. Lastly the controller 112 writes the data that is not required to be updated in the pages PA4~PAN of the mother block 302 into the pages PC4~PCN to complete data integration. After finishing data integration, the controller 112 erases the mother block 302 and the first FAT block 402, and puts the erased data block into the spare region 130. In some embodiments, the controller 112 may also integrate the data that is not required to be updated in the mother block 302, the updated data in the first FAT block 402 and the updated data in the second FAT block 404 into a spare block.

FIG. 5A~5D are diagrams of a method for handling data updating of a flash memory. The following describes a second embodiment of the method for handling data updating of a flash memory in coordination with FIGS. 3 and 5A~5D.

Figure 5A:
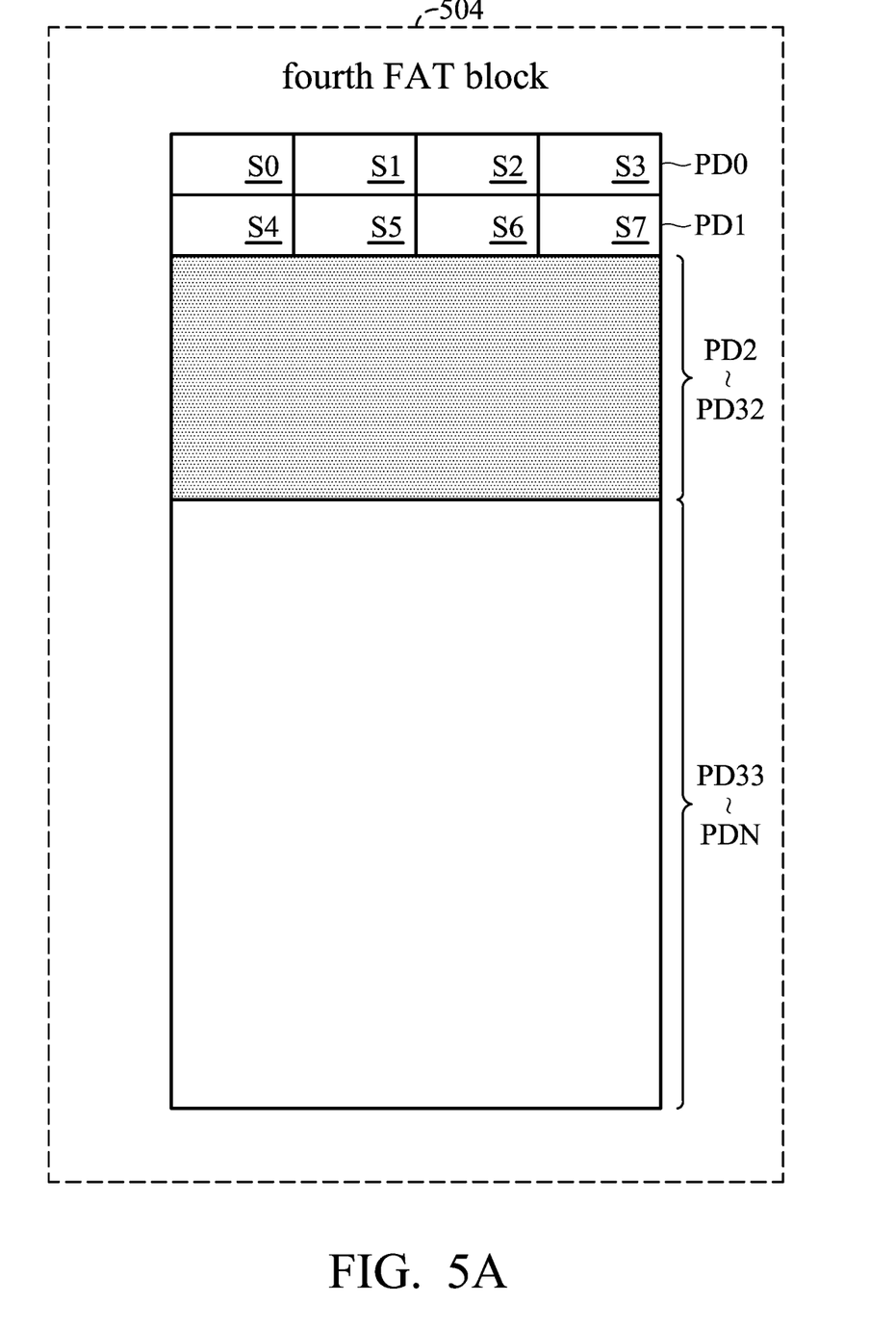
FIG. 5A is a diagram of the first and the second FAT block in the flash memory according to the invention.

Assume that the host 102 requires the controller 112 to update the sectors S8~S134 of the pages PA2~PA32 in the mother block 302, and delivers the data S8"~S134" to update sectors S8~S134 to the controller 112, the host 102 delivers an instruction, in which the write LBA and data length of the instruction are the 8 and 127 sectors, respectively. The controller 112 selects the spare block as a third FAT block 502 from the spare region 130, and obtains the data D8"~D11" of the sectors S8~S11 in the page PA2. Since the data comprise the data D11" for updating the ending sector S11 in the page PA2, the controller 112 selects another spare block as a fourth FAT block 504 from the spare region 130. Afterwards the controller 112 writes the data D8"~D11" of the sectors S8~S11 for updating the page PA2 into the sectors S8~S11 of the page PD2 of the fourth FAT block 504.

Figure 5B:
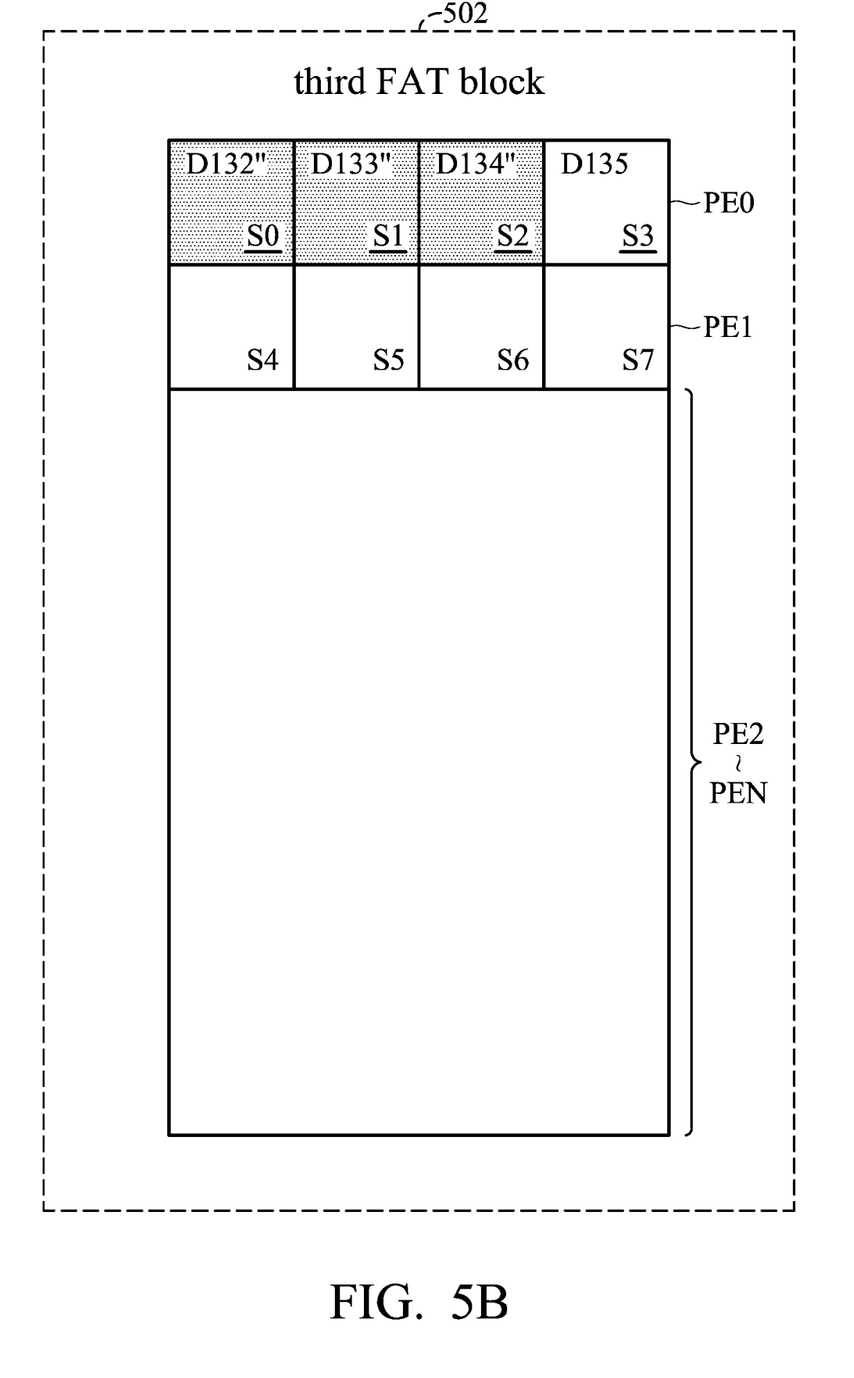
FIG. 5B is another diagram of the first and the second FAT block in the flash memory according to the invention.

The controller 112 then obtains the data D12"~D15" to update sectors S12~S15 in the next page PA3. Since the data comprise the data D15" for updating the ending sector S15 in the page PA3, the controller 112 writes the data D12"~D15" to update sectors S12~S15 in the page PA3 into the sectors S12~S15 of the page PD3 of the fourth FAT block 504, respectively, and so forth, as shown in FIG. 5A. When the controller 112 obtains the data D132"~D134" for updating the sectors S132~S134 in the page PA33, since the data do not comprise data for updating the ending sector S135 in the page PA32, the controller 112 obtains the data D135 of the sector S135 of the page PA33 from the mother block 302, and writes the data D132"~D134" and D135 into the sectors S0~S3 of the page PE0 of the third FAT block 502, as shown in FIG. 5B.

Figure 5C:
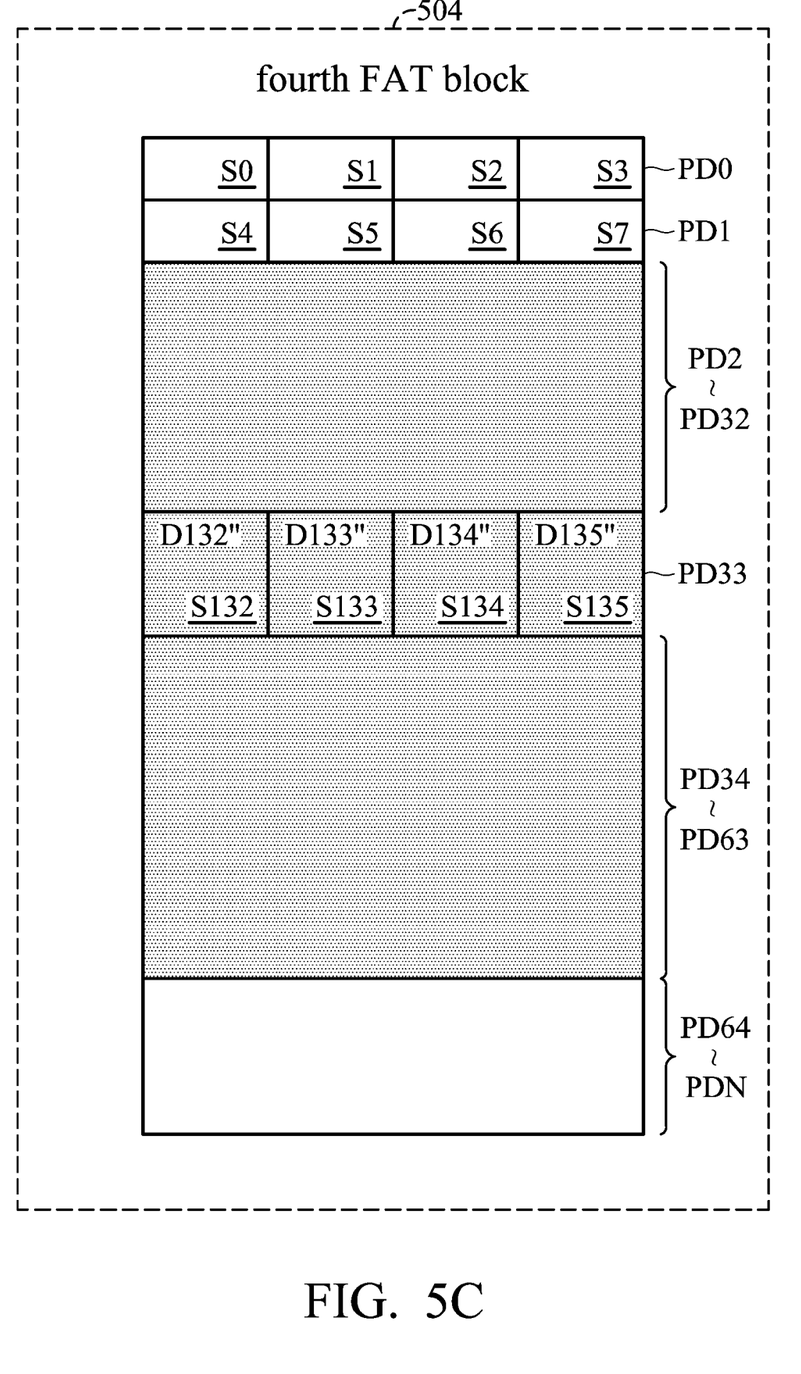
FIG. 5C is another diagram of the first and the second FAT block in the flash memory according to the invention.

Assume that the host 102 then requests the controller 112 to update the sectors S135~S261 of the pages PA33~PA64 in the mother block 302, and delivers the data D135"~D261" to update sectors S135~S261 to the controller 261, the host delivers an instruction, in which the write LBA and data length of the instruction are the 135 and 127 sectors. Since the data comprise the data D135" for updating the ending sector S135 in the page PA33, the controller 112 obtains the data D132"~D134" of the sectors S132~S134 in the page PA33 from the page PE0 of the third FAT block 502, and writes the data D132"~D135" into the sectors S132~S135 of the page PD33 of the fourth FAT block 504, respectively.

The controller 112 then obtains the data D136"~D139" to update sectors S136~S139 in the next page PA34. Since the data comprise the data D139" for updating the ending sector S139 in the page PA33, the controller 112 writes the data D136"~D139" to update sectors S136~S139 in the page PD34 into the sectors S136~S139 of the page PD34 of the fourth FAT block 504, respectively, and so forth, as shown in FIG. 5C. When the controller 112 obtains the data D260"~D261" for updating the sectors S260~S261 in the page PD64, since the data do not comprise data for updating the ending sector S263 in the page PD64, the controller 112 obtains the data D262~D263 of the sector S262~S263 in the page PA64 from the mother block 302, and writes the data D260"~D261" and D262~D263 into the sectors S4~S7 of the page PE1 of the third FAT block 502, as shown in FIG. 5D.

Figure 5D:
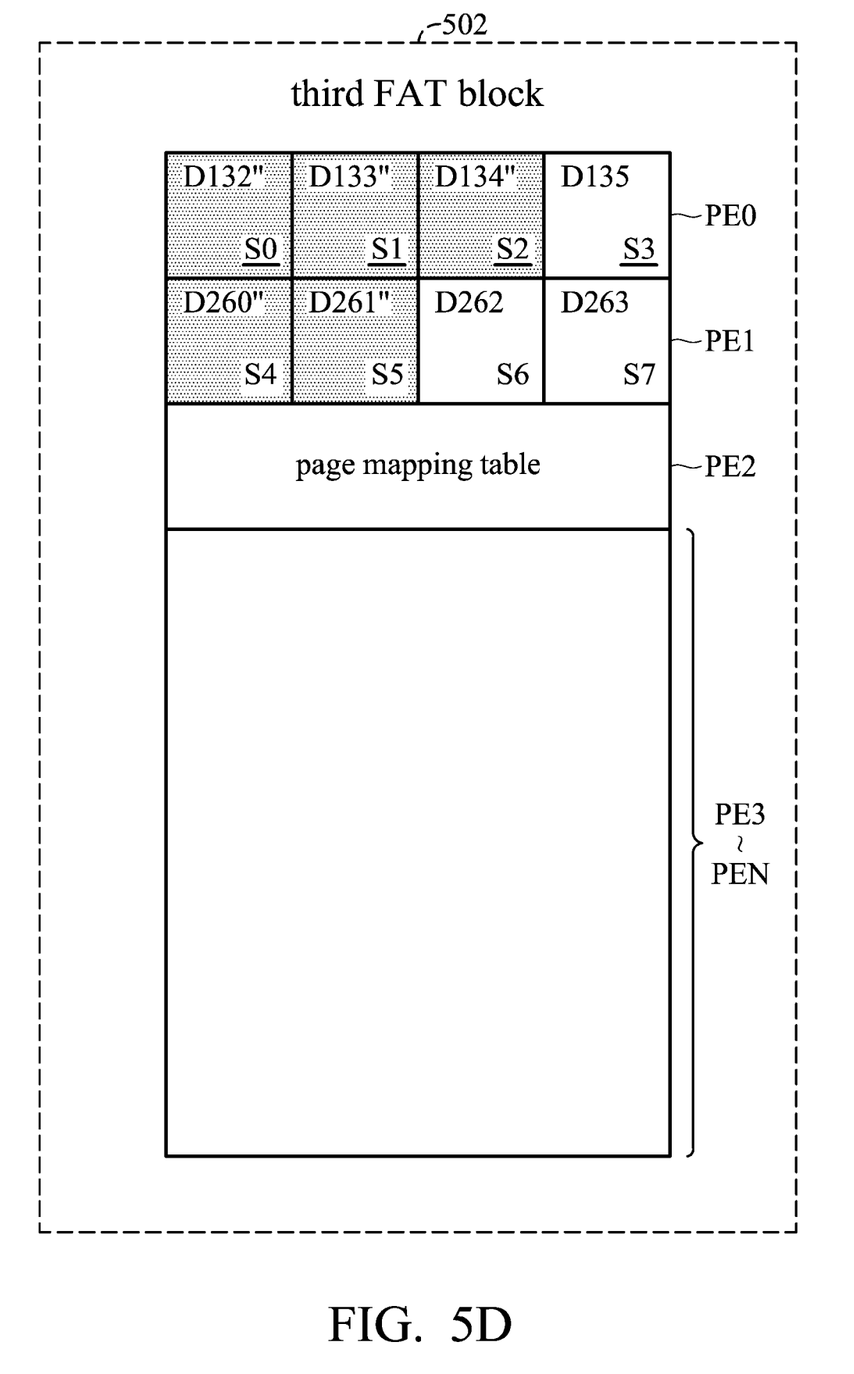
FIG. 5D is another diagram of the first and the second FAT block in the flash memory according to the invention.

If there is no page that is required to be updated in the mother block 302, the controller 112 records a mapping relationship between the replacing pages PD2~PD63 and the updated pages PA2~PA63 and/or the relationship between the corresponding page PE1 and the updated page PA64 to a page mapping table (such as the PE2 in FIG. 5D). The embodiment of the page mapping table is similar to the page mapping table of the FIG. 4F. When the third FAT block 502 is full and the latest data can not be written into it, the controller 112 proceeds with a data integrating process to integrate the data in the mother block 302, the updated data in the third FAT block 502 and the updated data in the fourth FAT block 504. After finishing data integration, the controller 112 erases the mother block 302 and the third FAT block 502, and puts the erased data block into the spare region 130.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for handling data updating of a flash memory, wherein the flash memory comprises a mother block with a plurality of pages to be updated, and each page comprises a plurality of sectors, comprising:
    obtaining a first data for updating a target page in the mother block;
    determining whether the first data comprises data for updating an ending sector in the target page;
    writing the first data into a replacing page in a first file allocation table (FAT) block when the first data does not comprise the data for updating the ending sector in the target page; and
    writing the first data into a corresponding page in a second FAT block when the first data comprises the data for updating the ending sector in the target page, wherein the corresponding page in the second FAT block and the target page in the mother block have the same page indexes,
    wherein the step of writing the first data into the replacing page in the first FAT block further comprises:
    obtaining a second data from the mother block, wherein the second data is configured to update sectors which are not updated by the first data in the target page; and
    writing the first and the second data into the replacing page in the first FAT block.

2. The method as claimed in claim 1, wherein the first and the second FAT blocks are selected from a spare region of the flash memory.

3. The method as claimed in claim 1, wherein the ending sector is the last sector in the target page.

4. The method as claimed in claim 1, wherein the step of writing the first data into the corresponding page in the second FAT block comprises:
    writing the first data into the corresponding page in the second FAT block when the first data comprises the data for updating all the sectors in the target page.

5. The method as claimed in claim 1, wherein the step of writing the first data into the corresponding page in the second FAT block comprises:
    obtaining the second data from the mother block or the first FAT block when the first data does not comprise the data for updating all the sectors in the target page, wherein the second data is configured to update sectors which are not updated by the first data in the target page; and
    writing the first and the second data into the corresponding page in the second FAT block.

6. The method as claimed in claim 1, further comprising:
    recording a mapping relationship between the target page and the replacing page or a mapping relationship between the target page and the corresponding page in the first FAT block in a page mapping table.

7. The method as claimed in claim 6, wherein the recording steps comprise:
    recording at least the page indexes of the replacing page on corresponding locations of the page mapping table as the mapping relationships of the page mapping table; and
    writing the page mapping table to a page of the first FAT block.

8. The method as claimed in claim 6, further comprising:
    integrating data stored in the mother block, data stored in the replacing page of the first FAT block, and data stored in the corresponding page of the second FAT block into a spare block.

9. The method as claimed in claim 6, further comprising:
    integrating data stored in the mother block and data stored in the replacing page of the first FAT block into the second FAT block according to the page mapping table.

10. The method as claimed in claim 9, further comprising:
    erasing the mother block and the first FAT block after integrating data stored in the mother block and data stored in the replacing page of the first FAT block into the second FAT block.

11. A memory card, comprising:
    a flash memory comprising a mother block, a first FAT block, and a second FAT block, wherein the mother block includes a plurality of pages to be updated, and each page includes a plurality of sectors; and
    a controller for obtaining a first data for updating a target page in the mother block, writing the first data into a replacing page in a first FAT block when the first data does not comprise data for updating an ending sector in the target page and writing the first data into a corresponding page in a second FAT block when the first data comprises the data for updating the ending sector in the target page, wherein the corresponding page in the second FAT block and the target page in the mother block have the same page indexes, wherein the controller obtains a second data from the mother block and writes the first and the second data into the replacing page in the first FAT block, when the first data does not comprise the data for updating the ending sector, and the second data is configured to update sectors which are not updated by the first data in the target page.

12. The memory card as claimed in claim 11, wherein the first and the second FAT blocks are selected from a spare region of the flash memory.

13. The memory card as claimed in claim 11, wherein the ending sector is the last sector in the target page.

14. The memory card as claimed in claim 11, wherein the controller writes the first data into the corresponding page in the second FAT block when the first data comprises data for updating all the sectors in the target page.

15. The memory card as claimed in claim 11, wherein the controller obtains the second data from the mother block or the first FAT block and writes the first and the second data into the corresponding page in the second FAT block, when the first data does not comprise the data for updating all the sectors in the target page, and the second data is configured to update sectors which are not updated by the first data in the target page.

16. The memory card as claimed in claim 11, wherein the controller further records a mapping relationship between the target page and the replacing page or a mapping relationship between the target page and the corresponding page in the first FAT block in a page mapping table.

17. The memory card as claimed in claim 16, wherein the controller records at least the page indexes of the replacing page on corresponding locations of the page mapping table as the mapping relationships of the page mapping table and writes the page mapping table to a page of the FAT block.

18. The memory card as claimed in claim 16, wherein the controller integrates data stored in the mother block, data stored in the replacing page of the first FAT block, and data stored in the corresponding page of the second FAT block into a spare block.

19. The memory card as claimed in claim 16, wherein the controller integrates data stored in the mother block and data stored in the replacing page of the first FAT block into the second FAT block according to the page mapping table.

20. The memory card as claimed in claim 19, wherein the controller erases the mother block and the first FAT block after integrating the data stored in the mother block and the data stored in the replacing page of the first FAT block into the second FAT block.

* * * * *